United States Patent [19]
O'Brien

[11] Patent Number: 5,196,125
[45] Date of Patent: Mar. 23, 1993

[54] UNDERGROUND EFFLUENT DISPOSAL-DELIVERY SYSTEM

[76] Inventor: Richard J. O'Brien, 1847 SW. 1st Ave., Ocala, Fla. 32671

[21] Appl. No.: 745,570

[22] Filed: Aug. 15, 1991

[51] Int. Cl.$^5$ .............................................. C02F 1/00
[52] U.S. Cl. ................................... 210/747; 210/170; 210/510.1; 239/200; 239/201
[58] Field of Search ...................... 210/170, 510.1, 747, 210/767, 796; 239/200, 201, 547, 145, 450

[56] References Cited

U.S. PATENT DOCUMENTS

| | | | |
|---|---|---|---|
| 2,573,639 | 10/1951 | Coler | 210/510.1 |
| 3,046,747 | 1/1959 | Timpe | 210/170 |
| 3,785,494 | 1/1974 | Sama | 210/510.1 |
| 3,798,104 | 3/1974 | Mallonee | 210/510.1 |
| 3,842,006 | 10/1974 | Burt | 210/510.1 |
| 4,317,539 | 3/1982 | Pollock | 239/200 |
| 4,958,770 | 9/1990 | Mitchell | 239/145 |

Primary Examiner—Robert A. Dawson
Assistant Examiner—David Reifsnyder
Attorney, Agent, or Firm—Saliwanchik & Saliwanchik

[57] ABSTRACT

A system for subsurface treatment and disposal of wastewater is described. The system comprises the conveyance of secondarily or tertiarily treated water through closed pipes having walls which are permeable to water. The invention further comprises the cleaning of the conveyance pipe via the introduction of compressed air which expands the pipe and removes debris.

3 Claims, 7 Drawing Sheets

|    | A      | B     |
|----|--------|-------|
| 1  | 10000  | 0.75  |
| 2  | 20000  | 1.48  |
| 3  | 30000  | 2.22  |
| 4  | 40000  | 2.96  |
| 5  | 50000  | 3.71  |
| 6  | 60000  | 4.44  |
| 7  | 70000  | 5.19  |
| 8  | 80000  | 5.93  |
| 9  | 90000  | 6.67  |
| 10 | 100000 | 7.41  |
| 11 | 110000 | 8.15  |
| 12 | 120000 | 8.89  |
| 13 | 130000 | 9.63  |
| 14 | 140000 | 10.37 |
| 15 | 150000 | 11.11 |
| 16 | 160000 | 11.85 |
| 17 | 170000 | 12.59 |
| 18 | 180000 | 13.33 |
| 19 | 190000 | 14.07 |
| 20 | 200000 | 14.81 |
| 21 | 210000 | 15.55 |
| 22 | 220000 | 16.29 |
| 23 | 230000 | 17.03 |
| 24 | 240000 | 17.77 |
| 25 | 250000 | 18.51 |

FIG. 3

UNDERGROUND EFFLUENT DISPOSAL-DELIVERY SYSTEM

BACKGROUND OF THE INVENTION

As the infrastructure of our country is called upon to provide increasing services, we will find that the quality of life we all enjoy will suffer. Advances in technology must be used to alleviate additional stress on the environment. The natural cleaning processes of the earth are insufficient to compensate for an ever-increasing burden placed on them to regenerate clean air and water.

A major problem associated with effluent disposal and treatment is the pollution of surface water and groundwater. The contamination by viruses, bacteria, nutrients, and heavy metals from effluent released into the lakes, rivers, streams, and bays of Florida is a major environmental problem facing the state. Inasmuch as the supply of water is limited by rainfall, its quality and quantity must be protected in order to provide for the ever-increasing demand.

In the past, effluent has been disposed of by a variety of means including deepwell injection; spraying on crops, fields, and golf courses; and by releasing both raw and treated effluent into available bodies of water. All of these methods have caused, or are suspected of causing, deterioration in the quality of the available potable and/or recreational water. The increasing influx of viruses, bacteria, nutrients, and heavy metals can overburden the ecosystem, causing undesirable plant growth, disruption of the normal hydrologic cycle, depletion of the oxygen supply and proliferation of disease-causing agents.

Modern secondary and tertiary treatment facilities produce a high grade of treated water, the disposal of which can be burdensome. If this water is moved to evaporation ponds, it immediately begins to deteriorate in quality. Deep well injection of this high quality effluent is problematic because of the unknown ramifications of placing this material into an environment where nature is totally unprepared to cope. A very real danger is that most facilities that are allowed to use this technique will not have a backup system to contain or dispose of effluent during those periods when the facility does not fully comply with governmental regulations. The effluent must be continually disposed. Spraying of effluent into the air introduces a potential health risk from airborne contaminants.

Therefore, with the ever-expanding population and commensurate increase in wastewater production, there is an urgent need to identify effective means of effluent treatment and disposal which can return large volumes of treated effluent to the environment with a minimum of adverse effects. The first view inches of soil provide the first line of defense in the purification of water being returned to the ecosystem after mankind has diverted this resource for its own use. This invention is intended to ensure that properly treated effluent is returned to the ecosystem through this layer at an optimum rate which is dictated by characteristics of the soil.

BRIEF SUMMARY OF THE INVENTION

The subject invention is a method for the treatment and disposal of wastewater effluent. The primary application of the subject invention is to provide a method for the most efficient and technologically desirable disposal of wastewater effluent. At the same time it may also be used to provide underground irrigation for athletic fields, parks, golf courses, median strips, or other municipal facilities. If land must be purchased for effluent disposal, the system of the subject invention allows for the multiple use of such land, thereby further enhancing the cost effectiveness of the taxpayers' purchase.

The process of this invention comprises the subsurface delivery and disposal of secondary and tertiary treated effluent by conveying this water through non-biodegradable, closed-end porous emitter pipes. The emitter pipes allow the effluent to pass through its porous walls. The emitter pipes used in the subject invention are well known to those knowledgeable in this art. Before emission, the effluent is subjected to filtration and treatment to remove nutrients and suspended particles.

The emitter pipes used according to the subject invention are flexible and capable of expansion in their circumference when subjected to increased pressure. This capacity to expand facilitates the cleaning of the pipe, which is an important element of the subject invention.

The emitter pipes can be made from ground rubber, polymers, and/or plastics. The emitter pipe is available from various manufacturers in different diameters as needed to achieve the effluent disposal rate desired and permitted by regulatory agencies.

Classical techniques known to those skilled in the art are employed to design and lay out the solid piping part of the system to accommodate the desired flow rate of effluent.

Previous attempts at disposing of wastewater effluent by underground means have met with limited success because roots can block orifices from the outside and algae and other organisms or the byproducts of their life processes can block orifices from the inside of the pipe. These problems have been solved by the use of flexible porous pipe combined with specific cleaning procedures, not the least of which is the use of compressed air.

By treating and disposing of this effluent according to the process described herein, it is possible to recharge underground aquifers, reduce salt water intrusion, deliver nutrients to the roots of growing vegetation, and avoid polluting surface waters. The subject invention is compatible with the dual usage of the land as it can serve both as a return site by infiltration and still be arable.

If other than treatment and disposal of the effluent is desired, it may also be used to provide underground irrigation for municipal athletic fields, parks, golf courses, median strips, or other municipal facilities. This eliminates visible and hazardous spray heads (requiring high maintenance). In addition, it decreases the pollution problem caused by runoff. It also solves the odor problem which is often associated with surface disposal of effluent. The possibility of atmospheric contamination by airborne particles from spraying effluent is eliminated. Another major advantage of the subject invention is the use of existing municipal property for treatment and disposal.

An important aspect of the process described here is the periodic cleansing of the effluent emitting pipe. Previous attempts at disposing of wastewater by underground means have been unsuccessful because roots can block orifices from the outside, and because algae and other vegetative growth can block orifices from the inside of a pipe. These problems have been solved by the use of flexible and porous pipe combined with specific cleaning procedures. Specifically, a maintenance procedure whereby bacteria and algae growth, as well as other deposits, are removed from the inside of the pipe by the introduction of compressed air is utilized.

BRIEF DESCRIPTION OF THE DRAWINGS

FIG. 3 shows estimates of the site size recommended based on gallons of effluent to be disposed of per day.

Shown are the pump station 1, 6-inch PVC or 180 millimeter PEH main 2, 4-inch PVC or 110 millimeter PEH main 3, and 3-inch zone valves 4.

Figure 4:
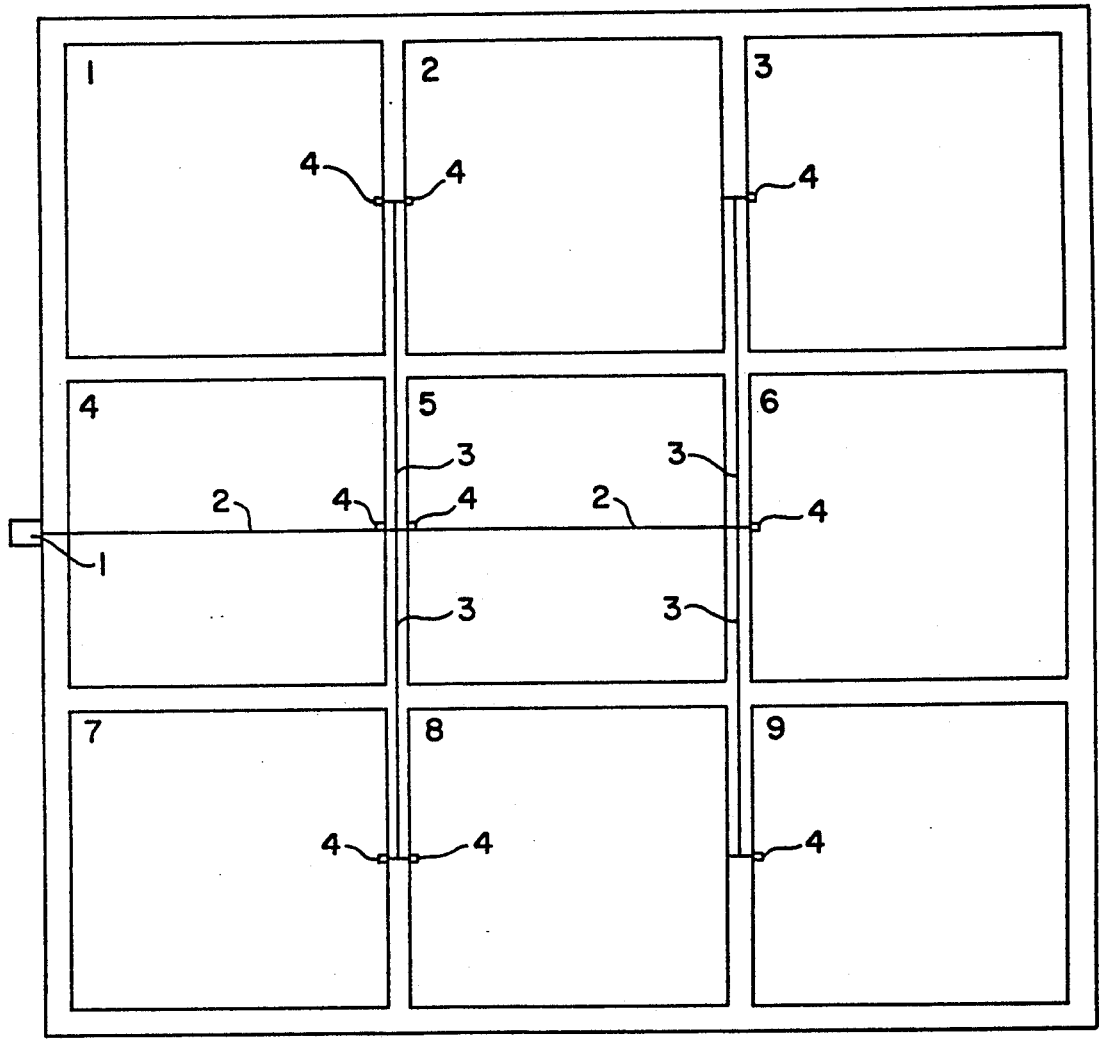
FIG. 4 shows an example of a layout designed to dispose of approximately 250,000 gallons of effluent per day with 100% backup capability. Shown is a mainline layout for nine hectares, each 100 meters by 100 meters. The system is designed to operate three hectares at once (Blocks 1, 4, 7; Blocks 2, 5, 8; or Blocks 3, 6, 9) such that each hectare can receive at least 25 mm (1-inch) of water per 24 hour cycle directly into the soil through the subsurface system.
Figure 5:
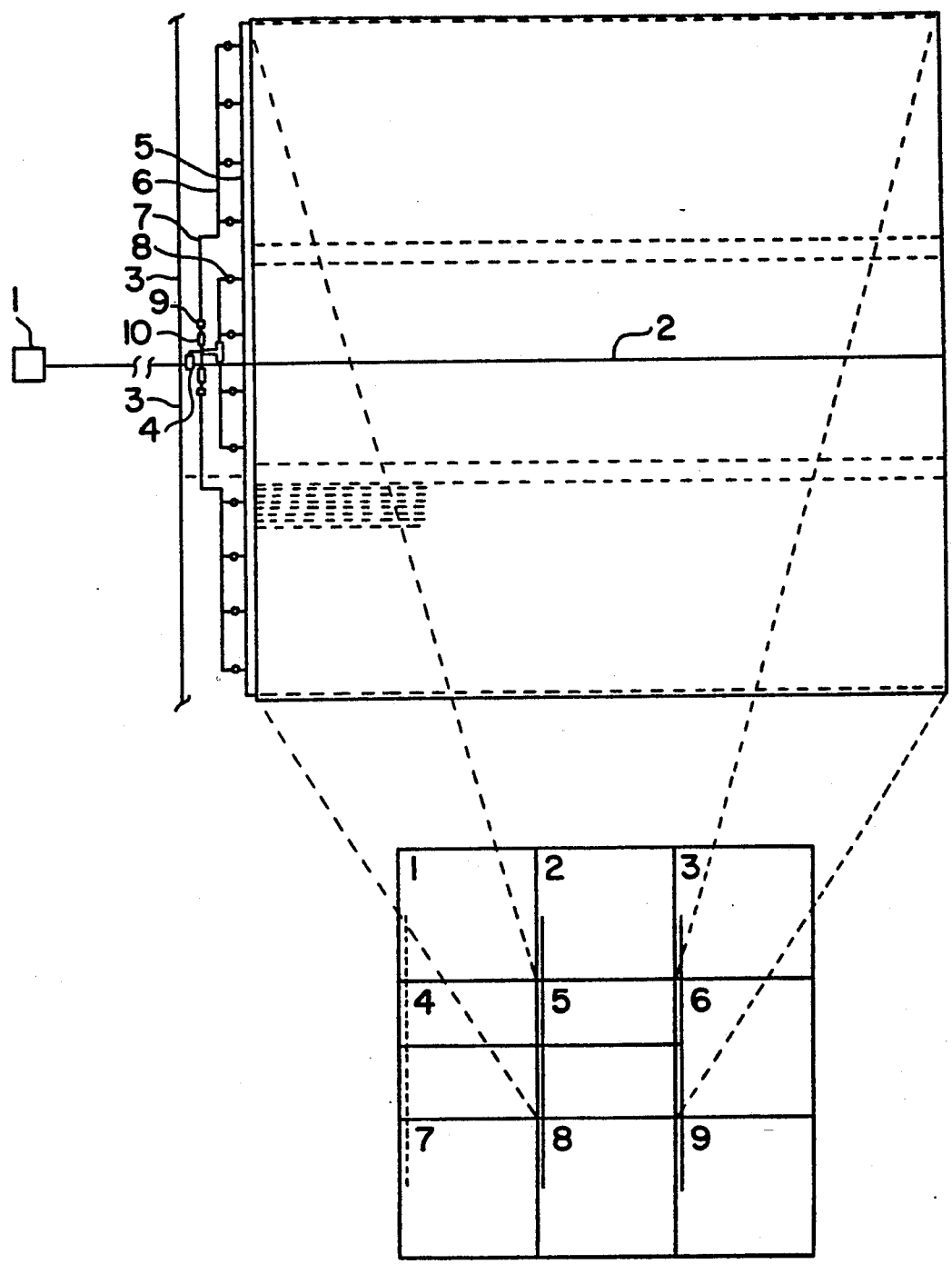

FIG. 5 shows a detailed view of block 5 of the design from FIG. 4. Specific components shown are: 1-inch PVC pipe 5, 1.25-inch PVC pipe 6, 1.5-inch PVC pipe 7, pressure regulator 8, main to Block 2 3, filter 9, 1.5-inch valve 10, pump station or source 1, main to Block 8 3, 3-inch zone valve 4, main to Blocks 3, 6 and 9 2.

Figure 6:
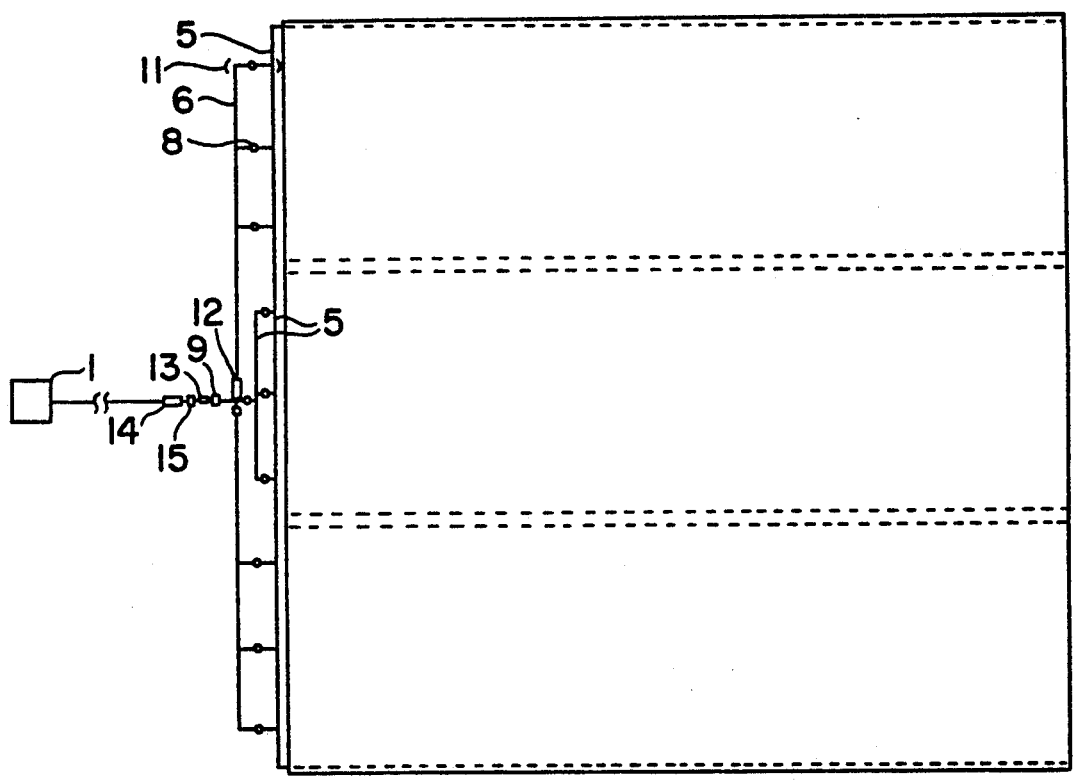

FIG. 6 shows a detailed layout of a one acre site capable of disposing of approximately 12,500 gallons per day of effluent with 100% backup reserve. This design is suitable for row spacings from 75 cm to 200 cm between runs of LP125M. Specific components shown are: 1-inch PVC pipe 5, swing joint 11, 1.25-inch PVC pipe 6, pressure regulator 8, 1.25-inch zone valve 12, filter 9, chemical injector 13, pump station or source 1, master valve 14, and water meter 15.

Figure 7:
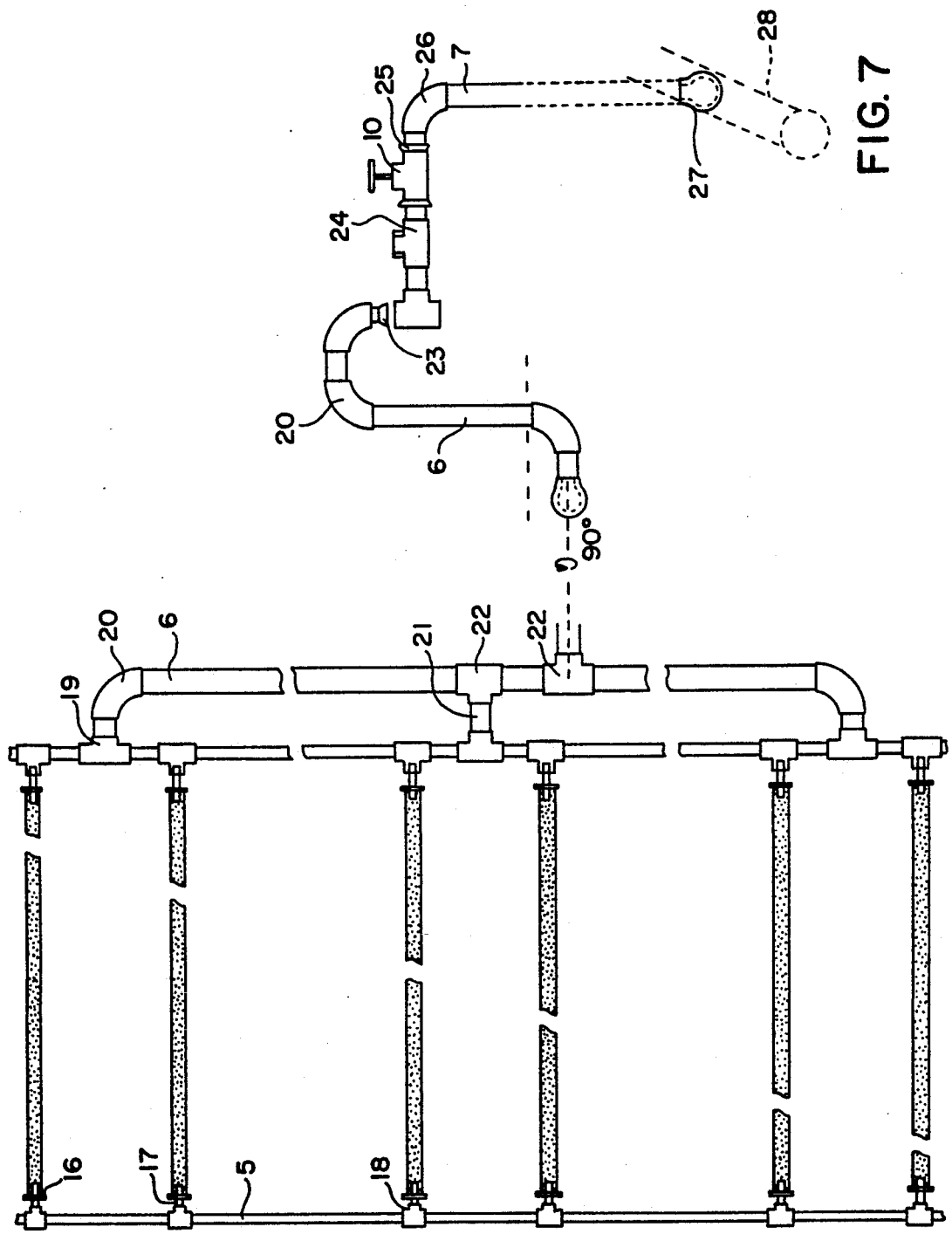

FIG. 7 shows an example of an infiltration grid with adaptation of the emitting device to a solid piping system. Specific components shown are: clamp 16, insert adaptor 17, 1-inch PVC pipe 5, 1×0.5-inch SLxTH tee 18, 1.25×1-inch bullhead tee 19, 1.25-inch ell 20, 1.25-inch PVC pipe 6, 1.25-inch cl. nipple 21, 1.25-inch tee 22, 1.5×1.25-inch bushing 23, 1.5×0.5 SLxTH tee 24, 1.5-inch valve 10, 1.5-inch male adaptor 25, 1.5-inch ell 26, 1.5-inch PVC pipe 7, 2×1.5 SLxSL tee 27, 2-inch main 28.

DETAILED DESCRIPTION OF THE INVENTION

The subject invention is a subsurface disposal-delivery system that takes the end product from a secondary or tertiary sewage treatment facility operating in compliance with state and federal guidelines and facilitates the return of this effluent to the aquifer in a timely and natural fashion.

The process of the subject invention can be practiced in two parts: The effluent monitoring/post-treatment station and the effluent transport and emission segment.

The effluent monitoring/post-treatment section (Pump Station) first subjects the effluent coming directly from the treatment facility to filtration to insure that the effluent coming from the facility is of a particle size that will not clog the station. The filtration may be, for example, through a screen filter of 400 mesh. The water can then be subjected to ozonation to insure the destruction of pathogens and promote the coagulation of suspended solids. Depending on the distance to the infiltration site, a holding tank can be employed at this point to give the required contact time for the ozonolysis process.

The effluent transport and emission portion of the process comprises transport of the wastewater through an underground grid system of emitter pipe. Emitting tubing of any diameter from $\frac{1}{4}$ inch to 1.5 inches or more can be used. Size selection depends on the disposal requirements of the particular treatment facility. The tubing of choice is connected to a solid pipe delivery system bringing chemically treated and filtered water from the source.

The system is equipped with injection apertures for the introduction of compressed air as a means of flushing and flexing the effluent emitting pipe as part of the maintenance program and can come with a compressor of sufficient size to flush the sections (or zones) at 100-150 psi as dictated by the design requirements of the particular project. It has been found that a pressure of 120 psi is most effective in achieving the desired cleaning. For optimum results, these injection apertures are located upstream of the emitter pipe. The exact location of the injection apertures can be readily determined by a person skilled in the art, taking into account the specific configuration of the system.

The preferred emitter pipe for such an application will function at pressures of 10 psi or less, to avoid subsurface channeling, and be immune to intrusion of particles outside the emitter wall.

Following are examples which illustrate procedures, including the best mode, for practicing the invention. These examples should not be construed as limiting.

EXAMPLE 1

System Performance

Figure 1:
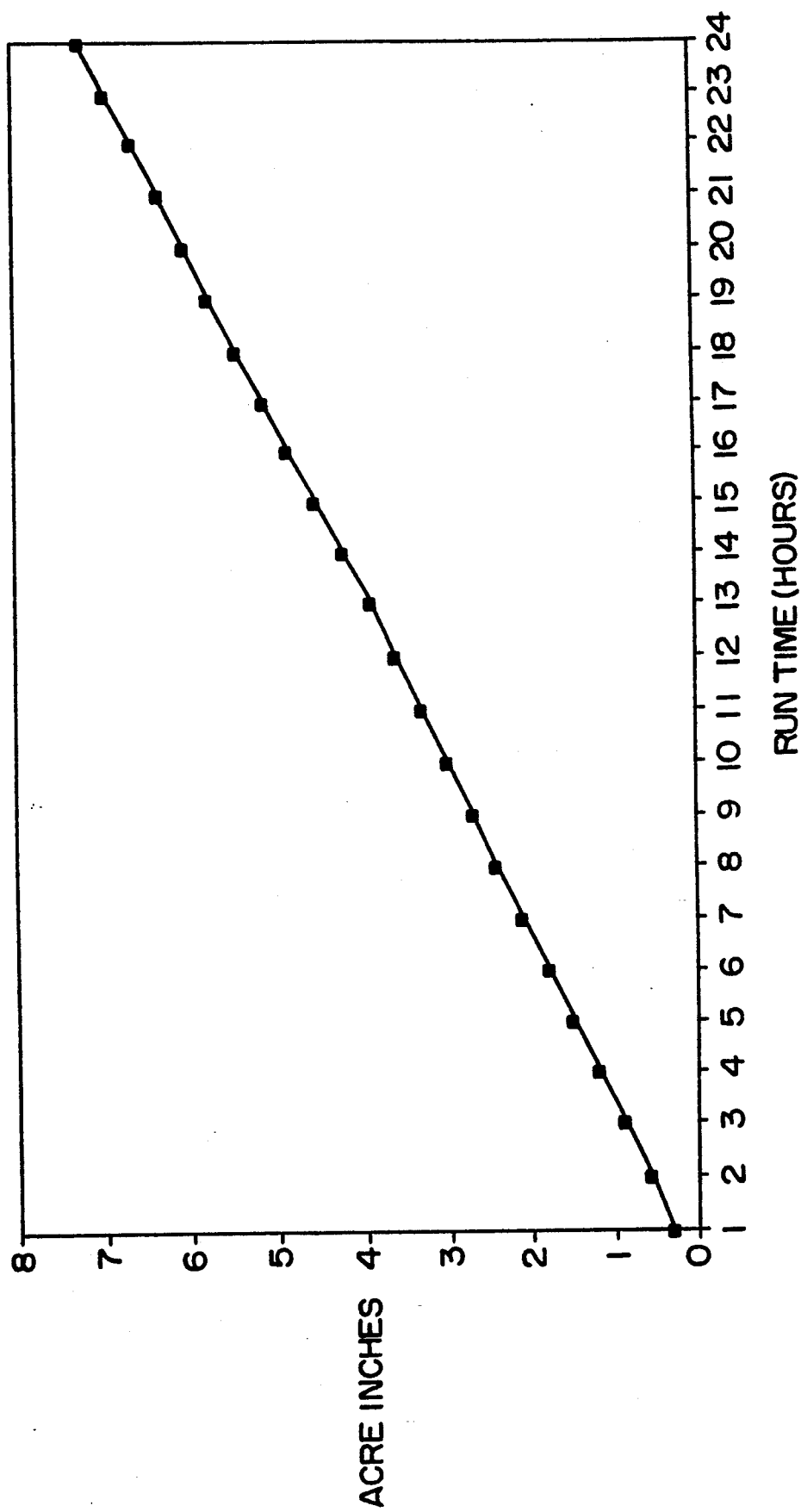
FIG. 1 shows the maximum flow rate for one configuration of the system.
Figure 2:
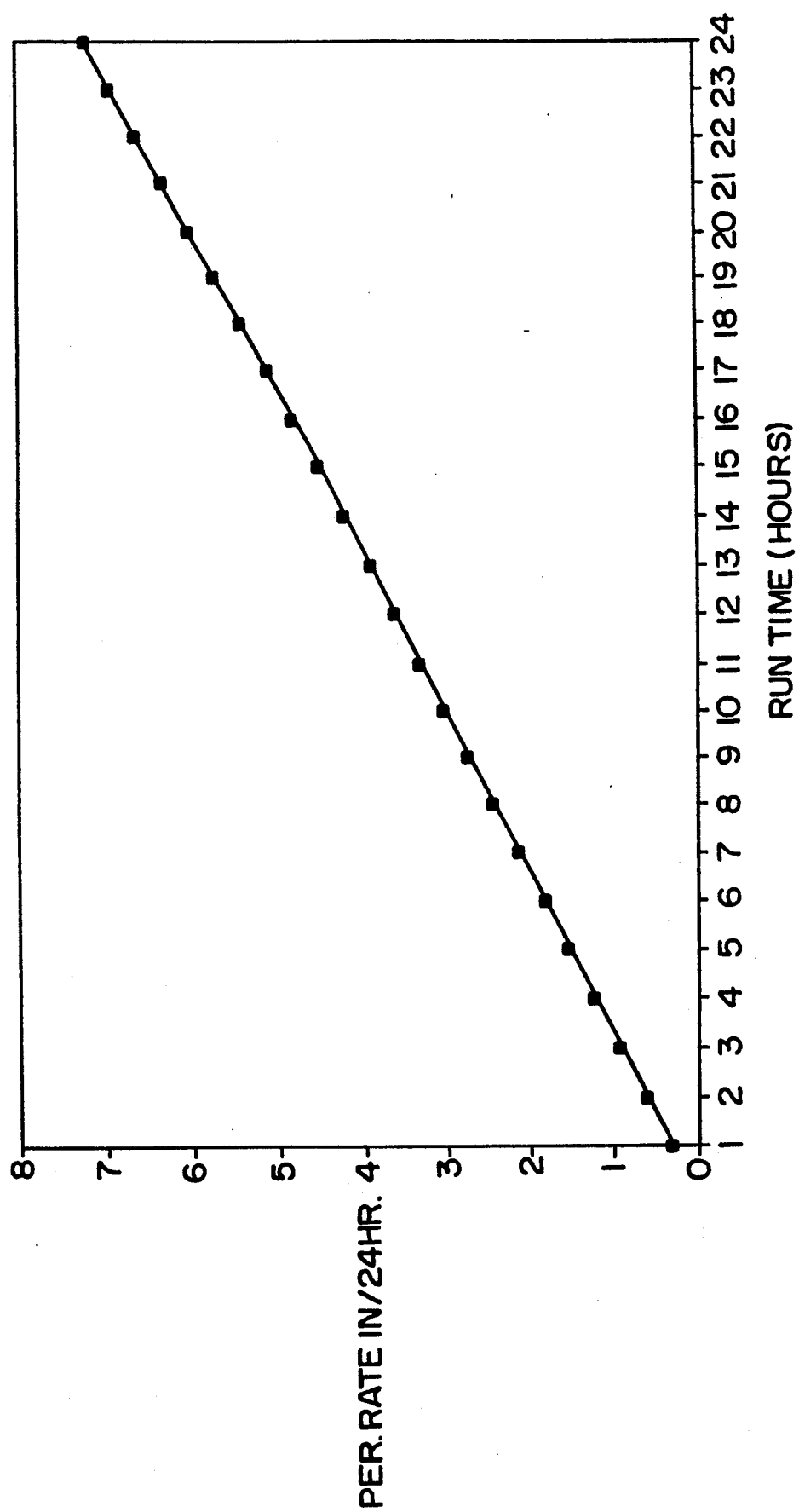
FIG. 2 shows run time needed to avoid soil saturation.

We have observed the performance of our novel process and system at a variety of sites for extended periods of time. FIGS. 1 and 2 illustrate the maximum flow possible from our optimum setup and the run time necessary to replace the desired quantity of wastewater effluent back into the ground water table at maximum flow. Any infiltration rate below this maximum is allowed by the subject invention using the flow monitoring/post-treatment station equipment. The equipment required is well known to those skilled in the art. For example, FIG. 1 indicates that it would take the subject invention a minimum of about three hours to return one acre inch of effluent to a one acre site. This corresponds to about 27,000 gallons of effluent. In actual operation, the flow through the system would be adjusted to deliver this quantity of effluent in a continuous manner during any period of time desired beyond the three hour minimum.

FIG. 2 relates the output during continuous run of the subject invention, under nominal operating conditions, in relation to the percolation rate of soils ranging from a theoretical 0.00 inches per day to 8.00 inches per day. This data is used indirectly to determine the minimum site size, in acres, needed to dispose of a facility's daily effluent output without exceeding the percolation rate of the soil.

For example, the volume of effluent needed to be disposed of daily is divided by the percolation rate of the soil at the site in acre inches per 24 hour period times 27,000 gallons per acre inch. This calculation gives the theoretical minimum number of acres needed to dispose of the desired amount of effluent. The subject invention can allow continuous flow up to a maximum of approximately eight acre inches per day. However, it is strongly recommended that systems be designed to dispose of no more than one acre inch per 24 hour period. Accordingly, $$\frac{\text{Gallons per day of effluent from facility}}{\text{One acre inch per 24 hours} \times 27{,}000 \text{ gallons}},$$

will give the recommended number of acres needed to dispose of the effluent. This number should be doubled in order to provide for 100% backup during maintenance and repair cycles. Thus, a facility needing to dispose of 50,000 gpd would need a minimum of 50,000 gpd/27,000=1.85 acres. With another 1.85 acres needed to provide for 100% backup capability, or approximately 3.70 acres of infiltration area for each 50,000 gpd of effluent. FIG. 3 shows estimates of the site size recommended based on gallons of effluent to be disposed of per day. Column A is gallons per day of effluent to be infiltrated and column B is the corresponding minimum acreage recommended for the infiltration site. This chart assumes that the site percolation rate is at least one acre inch per day and provides for the recommended 100% backup.

EXAMPLE 2

System Maintenance

To cleanse the system, a source of compressed air is used. This source may be centrally located at a pump station and the entire process automated, or this cleansing may be done manually. First, all the water should be forced from the system through appropriately placed flush valves in the infiltration system. Second, each zone is subjected to compressed air, as high as 120 psi, to pressurize the emitting pipe lateral lines.

Finally, the flush valves are opened very quickly to obtain the maximum flexing of the emitter piping grid as possible. A maintenance procedure involving monthly flushout and repair of any leaks is recommended. The flow from the treatment plant will not be interrupted as the subject invention is designed to provide duplication of required capacity. Thus, if one unit is not in operation for maintenance or repairs, the other is activated. One skilled in the art of maintaining low volume irrigation systems would be knowledgeable of standard techniques required for cleaning and maintenance programs. These standard techniques, combined with the teachings herein, would fully enable a person to practice the subject invention. An example of a weekly maintenance schedule is shown below.

1. Open all flush valves at corners of all zones.
2. Turn on water at meter boxes for all zones.
3. Set filter to backflush.
4. Turn timer to appropriate zone to activate pump.
5. Backflush.
6. Turn off pump.
7. Return filter lever to filter position.
8. Close all zone valves.
9. Return timer to same position as when service began.

EXAMPLE 3

System Design

FIG. 4, EICL-9HML, Effluent Infiltration Class-9 Hectare Multiple Layout (one hectare=2.47 acres), is an example of a layout designed to dispose of approximately 250,000 gallons of effluent per day (gpd) with 100% backup capability. Total acreage required is about 25 acres. We recommend that acreage be figured based on 25,000 gallons per acre per day as a conservative approach to sizing an infiltration site. FIG. 5 shows a detailed view of block 5 of the design from FIG. 4. This represents approximately a 2.5 acre site capable of disposing of about 25,000 gpd with 100% backup capability. Block 5 can be considered as a stand-alone design which would be matched with the appropriately sized and equipped flow monitoring/post-treatment station.

FIG. 6, EICL-ARC, is a detailed layout of a one acre site capable of disposing of approximately 12,500 gpd of effluent with 100% backup reserve. These designs represent sufficient engineering data so as to allow persons skilled in the art to duplicate the effluent monitoring/post-treatment station and the transport of said effluent to the infiltration segment of the subject invention.

The second part of the subject invention utilizes an effluent emitting pipe made of rubber, polymers, and/or plastics available from several domestic manufacturers. Effluent delivered to this section of the system is uniformly distributed throughout the infiltration grid using special pressure regulating devices available from domestic manufacturers that allow the effluent to manifest a very low pressure inside the emitting pipe, typically about 3 psi when operating at nominal conditions. FIG. 6 provides sufficient detail for a person skilled in the art to reproduce our results. FIG. 7 shows a typical method for laying out an infiltration grid and adapting the emitting device to the solid piping system.

Emitting tubing of various diameters can be used. Size selection depends on the disposal requirements of the particular treatment facility and site of infiltration. The infiltration grid is fitted with flush valves, typically at all four corners of each isolated grid arrangement, as a means of flushing and flexing the effluent emitting pipe as part of the maintenance program. A spacing between emission pipe laterals of two feet has been found to be the most efficient.

EXAMPLE 4

Installation Procedure

The soil type, percolation rate, and topography of the site selected will dictate many of the design characteristics. There are many classic labor saving techniques for the installation of a grid-type system. An important technique is to use the appropriate plow device, available from the manufacturer of choice for the emitting pipe. We used a three point hitch plow with a hollow tube foot, reel, and coulter wheel, as available from Entek in Southlake, Tex.

The depth at which to install the emitting pipe is determined by the nature of the soil. Assuming an infiltration rate of one acre inch per day as a conservative goal for any particular site, the depth necessary to avoid surface pooling can easily be determined by a skilled artisan. The goal is to maximize the natural biological processes occurring in the top few inches of soil while avoiding surface pooling or mires. Any person skilled in the art of low volume irrigation system installation would be enabled to install the subject invention as described herein.

It should be understood that the examples and embodiments described herein are for illustrative purposes only and that various modifications or changes in light thereof will be suggested to persons skilled in the art and are to be included within the spirit and purview of this application and the scope of the appended claims.

I claim:

1. A process for upgrading and disposing of wastewater taken directly from a wastewater treatment facility, said process comprising conveyance of said wastewater through a closed, subsurface pipe which allows the conveyance of said wastewater through the walls of said pipe, wherein said conveyance occurs essentially uniformly over the length and surface area of said pipe, and wherein said pipe is periodically cleaned by removing water from said pipe and increasing air pressure in said pipe to at least about 20 psi.

2. The process, according to claim 1, wherein said pipe is cleaned by increasing the air pressure within said pipe to between about 100 psi and about 120 psi.

3. The process, according to claim 1, wherein said process further comprises ozonation of said wastewater before conveyance through said pipe.

* * * * *